United States Patent
Ficek et al.

(10) Patent No.: US 6,756,550 B2
(45) Date of Patent: Jun. 29, 2004

(54) ELECTRIC SWITCH UNIT

(75) Inventors: Wojciech Ficek, Lüdenscheid (DE); Klaus Hirschfeld, Lüdenscheid (DE)

(73) Assignee: Leopold Kostal GmbH & Co. KG, Lüdenscheid (DE)

( * ) Notice: Subject to any disclaimer, the term of this patent is extended or adjusted under 35 U.S.C. 154(b) by 0 days.

(21) Appl. No.: 10/654,383

(22) Filed: Sep. 3, 2003

(65) Prior Publication Data

US 2004/0074746 A1 Apr. 22, 2004

(30) Foreign Application Priority Data

Sep. 12, 2002 (DE) .......................................... 102 42 253

(51) Int. Cl.⁷ ................................................. H01H 9/00
(52) U.S. Cl. ........................ 200/61.54; 200/4; 200/292
(58) Field of Search ...................... 200/4, 61.27–61.38, 200/61.54–61.57, 292, 512–517

(56) References Cited

U.S. PATENT DOCUMENTS

| | | | | |
|---|---|---|---|---|
| 5,436,413 A | * | 7/1995 | Katakami | 200/14 |
| 5,581,058 A | * | 12/1996 | Javery et al. | 200/4 |
| 5,939,686 A | | 8/1999 | Bellach et al. | |
| 5,967,300 A | | 10/1999 | Hecht et al. | |
| 6,091,033 A | * | 7/2000 | Kato | 200/61.54 |
| 6,566,616 B1 | * | 5/2003 | Ha | 200/61.54 |

FOREIGN PATENT DOCUMENTS

| | | |
|---|---|---|
| DE | 195 38 767 A1 | 10/1995 |
| DE | 197 23 482 C1 | 6/1997 |

\* cited by examiner

Primary Examiner—James R. Scott
(74) Attorney, Agent, or Firm—Brooks Kushman P.C.

(57) ABSTRACT

A switch assembly includes a rotary-push switch group placed on a switch lever. The switch group includes rotary and push switches each having movable contacts supported on corresponding fixed contacts. The rotary switch includes a rotary actuating element actuable to rotate about a longitudinal axis of the switch lever to actuate its movable contacts. The push switch includes an actuating element actuable to move axially along the longitudinal axis in response to axially directed pushing movement to actuate its movable contacts. The fixed contacts associated with the movable contacts of the rotary switch lie in a plane transverse to the longitudinal axis. A slider is engaged to the rotary actuating element to rotate therewith to guide the movable contacts of the rotary switch concentrically about the longitudinal axis. The slider is push-decoupled to the rotary actuating element such that pushing movement is absent from being felt by the slider.

16 Claims, 2 Drawing Sheets

ELECTRIC SWITCH UNIT

CROSS-REFERENCE TO RELATED APPLICATIONS

The Applicant claims foreign priority benefits for this application under 35 U.S.C. § 119 of DE 102 42 253.2 filed on Sep. 12, 2002.

BACKGROUND OF THE INVENTION

1. Field of the Invention

The present invention relates to an electric switch unit such as a steering column switch assembly having a rotary-push switch group placed at the free end of a switch lever, the switch unit including at least one rotary switch as well as a push switch that can be actuated by means of a pushing movement relative to the switch lever, whereby the one or more rotary switches and the push switch each have movable electrical contact elements that can be actuated by means of a respective actuating element and are supported on a fixed strip conductor structure that is held by a support and have corresponding fixed electrical contact surfaces on the fixed strip conductor structure.

2. Background Art

Electric switch units of this type are used in the automobile industry as steering column switches, for example. The switch lever on the free end of which the rotary-push switch group is placed is itself supported in pivoting fashion. The switch lever can be the vehicle's turn signal switch, for example.

An electric switch unit with the features mentioned above is known from DE 197 23 482 C1. The rotary-push switch group of this switch unit includes a rotary switch, the actuating element of which represents a cap that forms the free end of the rotary-push switch group. Various switch positions can be obtained by rotating the actuating cap around its longitudinal axis. Additional switching functions can be obtained by exposing the rotary-push switch group to a pushing force directed towards the switching lever, whereby the push switch arrangement is designed as a pushbutton switch.

The rotary switch and the push switch of this rotary-push switch group each have movable electrical contact elements. Each movable electrical contact element can be actuated by means of an actuating element and are supported on a fixed strip conductor structure. The required fixed electrical contact surfaces are part of this fixed strip conductor structure. Each of the movable electrical contact elements is held in a slider that is moved by the movement of the associated actuating element. The direction of movement of the slider lies in the longitudinal direction of the rotary-push switch group.

In order that the slider, which is provided for the rotary switch and bears the movable electrical contact elements, can be moved in the longitudinal direction in response to a rotary movement of the actuating cap on the end, the rotary movement of the actuating element must be converted into a translational movement for driving the slider. Provided for this purpose is a function element having a guide track in which a guide pin of the slider bearing the movable electrical contact elements engages. The function element is push-decoupled relative to the actuating cap of the rotary switch, but is positively engaged with this cap in terms of rotary torque.

The strip conductor structure surrounding the fixed electrical contact surfaces is a rigid circuit board that is contacted by means of a connection cable set. The circuit board is held by a support that is fastened in non-rotating and non-sliding fashion on the free end of the lever arm.

The sliders of the two switches of this rotary-push switch group bearing the movable electrical contact elements are arranged one after the other in the axial direction. This is done primarily against the background that with a configuration of a different design, the diameter of the rotary-push switch group would become too large. The axial length of the rotary-push switch group is thus co-determined by the number of sliders bearing the movable electrical contact elements.

At a higher functional density than that described in DE 197 23 482 C1, for example, in a configuration of a rotary-push switch group with two or more rotary switches, the axial extent of the switch unit described in the cited document would lengthen. Thus, an increase in the limits of the functional density of this previously known switch-unit is demonstrated, particularly with regard to a larger number of rotary switches, if a simultaneous increase in the diameter of the rotary-push switch group is not desirable.

Known from DE 195 38 767 A1 is another electric switch unit, which is designed as a steering column switch. Unlike the object of DE 197 23 482 C1, however, this switch unit includes only one push switch and no rotary-push switch group. In principle, the push switch of this document is constructed in a manner similar to that of the previously cited document. Unlike the previously described switch unit, the fixed electrical contact elements are part of a flexible conductive foil that is supported, in the region of the contacting carried out by the movable electrical contact elements, by a support so that adequate counter-support is provided for the movable electrical contact elements. The direction of movement of the movable electrical contact elements relative to the fixed conductive foil also lies in the longitudinal direction of the switch unit.

SUMMARY OF THE INVENTION

Starting from DE 197 23 482 C1, the present invention is based on the task of further developing an electric switch unit with a rotary-push switch group of the type mentioned above in such a way that in order to increase the functional density, the rotary-push switch group can not only be equipped with a greater number of rotary switches without having to extend the axial length of the rotary-push switch group excessively relative to the previously known configuration, but rather that the rotary switch or switches that are used can be made with fewer parts.

According to the present invention, this task is solved through the fact that the plane of the fixed electrical contact elements of the one or more rotary switches lies transverse to the longitudinal (i.e., axial) direction of the rotary-push switch group, and that assigned to each rotary switch is a slider, which is positively engaged to an actuating element of the corresponding rotary switch in terms of rotational torque but is push-decoupled relative to a pushing movement of the actuating element with the movable electrical contact elements.

Unlike the prior art, in this switch unit the plane of the fixed electrical contact elements lies transverse to the longitudinal direction of the rotary-push switch group, and thus transverse to the axis of rotation of the actuating element of the one or more rotary switches. The movable electrical contact elements of the rotary switch are thus guided along a movement path that is concentric with the axis of rotation of the actuating element. For this reason, the axial structural space that is required is reduced relative to previously known switch units; specifically, a plurality, for example, two rotary switches can be placed axially one behind the other without having to excessively increase the overall length of the rotary-push switch group.

An additional advantage of this configuration is the fact that the movable electrical contact elements of the rotary switch or switches can be moved by the actuating elements with no translational movement. A slider that is rotary torque-connected in positive fashion to its particular actuating element but is push-decoupled relative to a movement of the actuating element is assigned for that purpose to the movable electrical contact elements of each of the rotary switches.

For example, the slider can be a plastic body on which the movable electrical contact elements are placed. In principle, the movable electrical contact elements can be configured in such a way that they also have the function of the described slider. Such a kinematic connection, positively engaged in terms of torque but push-decoupled, with an actuating element can be realized, for example, with a fork, which is assigned to the slider and lies parallel to the axis of rotation, and in which a driving pin, designed as a pin or a web for example, of the actuating element engages. The driving pin can move freely in the axial direction within the fork, at least over the range of motion of the push switch, so that a push movement of the actuating element is not transmitted to the slider.

The strip conductor structure with fixed electrical contact surfaces for each rotary switch is advantageously a section of a flexible foil conductor, by means of which all of the required electrical wiring is realized, including the connections. The flexible properties of such a foil conductor are fully utilized for the placing of the plane of the fixed electrical contact surfaces, which plane lies transverse to the longitudinal direction of the rotary-push switch group, because it can easily be brought into the desired spatial arrangement of the fixed contact surfaces by means of folding or bending without it being necessary for several independent, separate strip conductor structures to be specially brought into electrical contact with each other for this purpose.

Such a flexible strip conductor is supported in the region of the fixed electrical contact surfaces by the support, which provides in each of these regions a contact frame or something similar. In a realization of, for example, two rotary switches, a contact frame that is placed transverse to the longitudinal direction of the rotary-push switch group can be used in order to place a section of such a foil conductor with fixed electrical contact surfaces on each of its end surfaces facing in the axial direction, and to fasten them to it.

Particularly when a flexible foil conductor is used, the push-switch arrangement can be placed in the region of the end of the rotary-push switch group that faces the end of the switch lever with no additional effort, so that additional space is available in the outer region of the rotary-push switch group for the placement of rotary switches.

In an advantageous configuration, the slider assigned to one rotary switch is mounted axially on the support. To install the slider on the support, the support advantageously has a radial installation or insertion opening that runs into an axial bearing opening. The slider can thus be placed radially on the provided axle of the support. The bearing opening of the slider is advantageously configured in such a way that the slider is held locked on the bearing axle of the support.

When two rotary switches are placed axially one axially behind the other inside such a rotary-push switch group, it is advantageous to separate them from each other by means of a torque-decoupled intermediate ring. Such an intermediate ring advantageously has spring means that act in the push direction (towards the switch lever) so that the two adjacent actuating rings of the rotary switches are play-free.

DETAILED DESCRIPTION OF THE PREFERRED EMBODIMENT(S)

Figure 1:
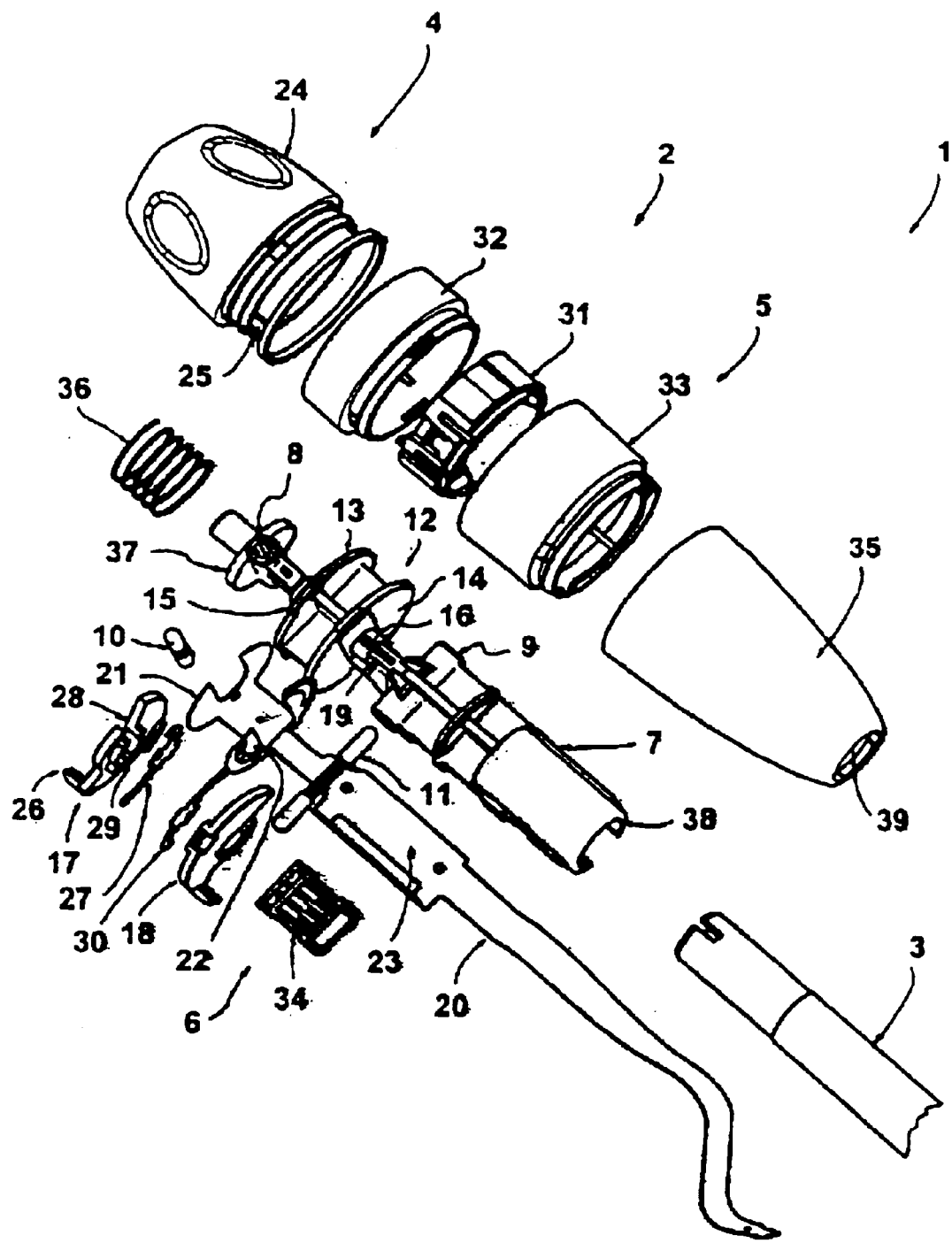
FIG. 1 illustrates a perspective view in the form of an exploded drawing of an electric switch unit with a rotary-push switch group in accordance with the present invention.

An electric switch unit 1 which may be designed as a steering column switch for a motor vehicle includes a rotary-push switch group. Rotary-push switch group 2 is designated in its entirety by reference symbol 2 and is placed at the end of a switch lever 3. Switch lever 3 is itself supported in pivoting fashion, whereby certain functions, e.g., the turn signal functions, can be operated by means of the pivoting movements of the switch lever. Rotary-push switch group 2 includes two rotary switches 4 and 5 and a push switch 6.

A support 7 is placed in rotary torque- and axially push-rigid fashion (i.e., non-movable) on the free end of switch lever 3. Support 7 holds the fixed parts which form first and second rotary switches 4 and 5 and push switch 6. Support 7 has seats 8 and 9 for the insertion of a respective detent sleeve assembly 10 and 11 into each, which in the embodiment shown are used for providing the desired haptics.

In addition, support 7 includes a contact frame 12 having two separate contact discs 13 and 14. Also part of support 7 are two bearing sections 15 and 16, which are adjacent to the sides of contact discs 13 and 14 that face away from each other and on each of which is supported in rotating fashion a slider 17 and 18. Each slider 17 and 18 is assigned to a respective one of first and second rotary switches 4 and 5. Bearing sections 15 and 16 are delimited on their ends facing away from the associated contact discs 13 and 14 by means of a limit stop 19 (only visible relative to bearing section 16 in FIG. 1).

A flexible foil conductor 20 is fastened on support 7. Regions 21, 22, and 23, in which the fixed electrical contact surfaces for realizing rotary switches 4 and 5 and push switch 6 are placed, are part of foil conductor 20. Foil conductor 20 is designed in such a way that each of regions 21 and 22 comes to rest on the outside of an associated contact disc 13 and 14 and is thus supported by them. Regions 21 and 22 of foil conductor 20 are held fast to the contact discs 13 and 14 respectively, for example, by means of an adhesive joint. Part of foil conductor 20 is also a connection section by means of which the rotary-push switch group is electrically contacted and connected to the vehicle's electrical system.

First rotary switch 4 includes as an actuating element an actuating cap 24 that forms the outer end of the rotary-push switch group 2. Actuating cap 24 is held in rotatable fashion relative to support 7. Actuating cap 24 bears on its inside a detent ring into which detent sleeve assembly 10, held in seat 8 of support 7, engages in order to provide the desired haptics for first rotary switch 4. Placed radially to the axis of rotation of actuating cap 24 and protruding from same is a driving pin 25, configured as a web, which engages in a fork seat 26, open in the axial direction of rotary-push switch group 2, of slider 17. In conjunction with this, the inside clearance of fork seat 26 essentially corresponds to the width of driving pin 25. In this way, driving pin 25 and thus actuating cap 24 can be displaced within fork seat 26 of slider 17 in the axial direction of rotary-push switch group 2.

By contrast, as a result of this engaging of driving pin 25 into fork seat 26, slider 17 is positively coupled in terms of torque to a rotating movement of actuating cap 24. Slider 17 bears movable electrical contact elements 27 of first rotary switch 4, which is supported on the outside of region 21 on the fixed electrical contact surface of foil conductor 20. Slider 17 has a radial insertion opening 28 that runs into an axially undercut-bearing opening 29. Installation of slider 17 takes place on bearing section 15 of support 7, with which the limit stop that delimits the bearing section 15 cooperates, in coded fashion, and is supported on the bearing section in such a way that the slider lies against the limit stop in its rotary movement region that is required in order to represent the switching function desired of first rotary switch 4.

In principle, second rotary switch 5 is designed the same way as first rotary switch 4, and is thus in agreement with the former in the method described for first rotary switch 4 in terms of its slider 18. Movable electrical contact elements 30 of slider 18 are supported on fixed region 22, bearing the electrical contact surface, of foil conductor 20. To provide haptics—working in cooperation with detent sleeve assembly 11—assigned to second rotary switch 5 is a detent ring insert 31, the inside of which has a detent ring that acts in the circumferential direction as well as in the axial direction.

Through detent ring insert 31, not only are the desired haptics provided for second rotary switch 5, but the haptics for push switch 6 as well. Detent ring insert 31 is inserted into an intermediate ring 32, which is rotation-decoupled versus actuating cap 24 of first rotary switch 4 and relative to an actuating ring 33 of second rotary switch 5. Intermediate ring 32 has spring means on its end facing switch lever 3 in order to hold movable actuating elements 24 and 33 against each other in play-free fashion. In reference to FIG. 3, intermediate ring 32 is described in more detail in terms of its spring means.

Figure 2:
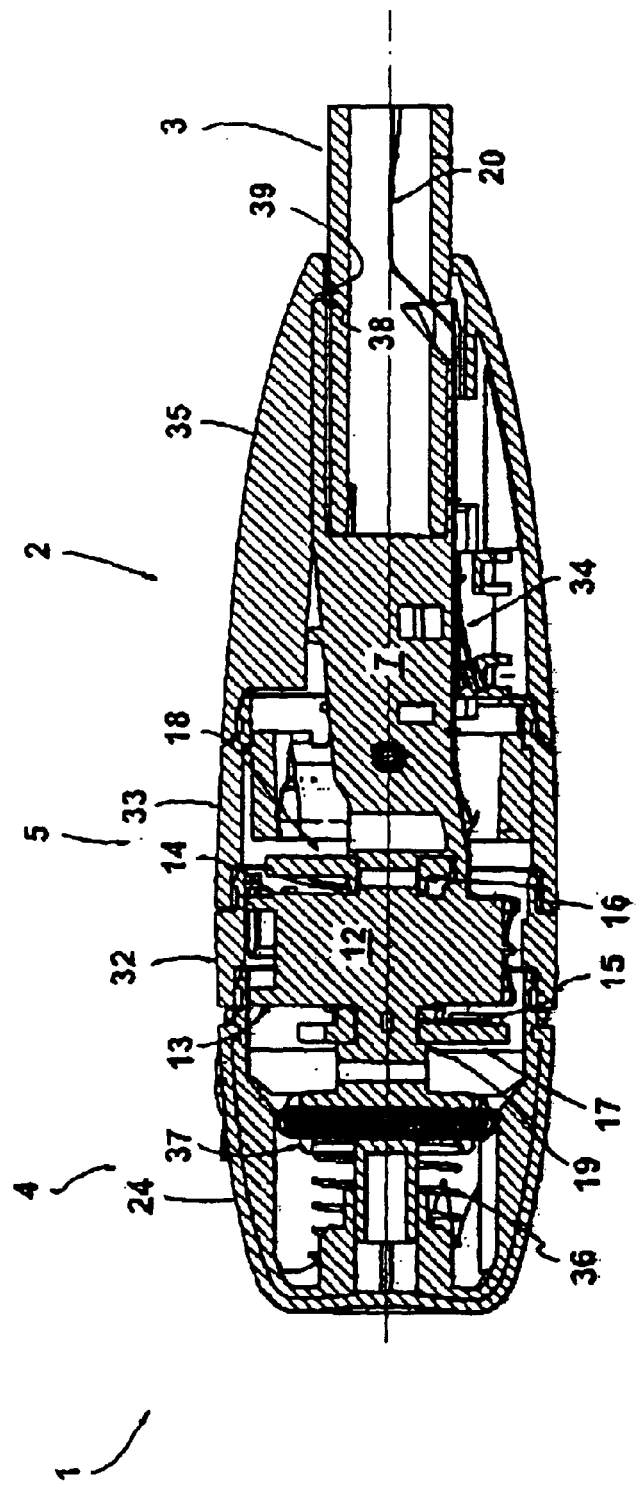
FIG. 2 illustrates a longitudinal section through the electric switch unit shown in FIG. 1.

The bedding of sliders 17 and 18 on bearing sections 15 and 16 respectively of support 7, and their radial bedding in particular, can be seen in the longitudinal section of FIG. 2.

Movable electrical contact elements 34 of push switch 6 are supported by an end cap 35, which is placed rotation-decoupled adjacent to actuating ring 33 of second rotary switch 5. Movable electrical contact elements 34 of push switch 6 are supported on region 23, which is assigned to the push switch, of foil conductor 20 in which the fixed contact surfaces are placed bare. In region 23 of foil conductor 20, the foil conductor lies against the underside of support 7. Movable electrical contact elements 34 of push switch 6 are moved by exerting a pushing movement on actuating cap 24 towards switch lever 3, through which this movement is axially transmitted to intermediate ring 32, actuating ring 33 of second rotary switch 5, and finally to end cap 35.

Basically, such a pushing movement can also take place through a grasping of the entire rotary-push switch group 2 and an axial movement towards switch lever 3. A resetting of push switch 6 can take place through appropriate design of the detent ring of detent ring insert 31, so that a resetting can ultimately take place on the basis of the elastic force provided by detent sleeve assembly 11 that engages in this detent ring.

In the embodiment shown, a pressure spring 36 is used to assist a resetting movement of the movable elements of push switch 6. Pressure spring 36 is supported, first, on a rear flange 37 of support 7, and second, on the inside of actuating cap 24 of first rotary switch 4. Pressure spring 36 is also used for the purpose of holding movable elements 24, 32, 33, and 35 next to each other in play-free fashion. Serving as counter-support for this purpose is a limit stop arrangement that is formed, first, by the end 38 of support 7 that faces switch lever 3, and second, by a shoulder 39 located on the inside of end cap 35.

Figure 3:
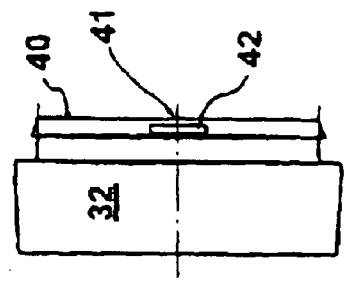
FIG. 3 illustrates a side view of an intermediate ring of the rotary-push switch group shown in FIG. 1.

The previously mentioned spring means of intermediate ring 32 are also used for a play-free arrangement of the individual movable elements relative to one another. Intermediate ring 32 bears—as can be seen in FIG. 3—on its end surface 40 that faces switch lever 3 two extensions 41 that are diametrically opposed to each other on the longitudinal axis of intermediate ring 32. Located behind each of extensions 41 is a spring opening 42 that is arranged following the peripheral surface and is designed as a slotted hole.

As a result of spring opening 42 and extensions 41, there thus exists the possibility that the extensions can compress into the spring opening due to the material elastic properties of the plastic used to make intermediate ring 32. On the end surface, extensions 41 are supported, under slight prestress, against the inside of actuating ring 33 of second rotary switch 5. Separate movable elements 24, 32, 33, and 35 are connected to each other by means of detent connections.

| List of Reference Symbols | | | |
|---|---|---|---|
| 1 | Switch unit | 24 | Actuating cap |
| 2 | Rotary-push switch group | 25 | Driving pin |
| 3 | Switch lever | 26 | Fork seat |
| 4 | Rotary switch | 27 | Movable electrical contact |
| 5 | Rotary switch | | elements |
| 6 | Push switch | 28 | Insertion opening |
| 7 | Support | 29 | Bearing opening |
| 8 | Seat | 30 | Movable electrical contact |
| 9 | Seat | | elements |
| 10 | Detent sleeve assembly | 31 | Detent ring insert |
| 11 | Detent sleeve assembly | 32 | Intermediate ring |
| 12 | Contact frame | 33 | Actuating ring |
| 13 | Contact disc | 34 | Movable electrical contact |
| 14 | Contact disc | | elements |
| 15 | Bearing section | 35 | End cap |
| 16 | Bearing section | 36 | Pressure spring |
| 17 | Slider | 37 | Flange |
| 18 | Slider | 38 | End surface |
| 19 | Limit stop | 39 | Shoulder |
| 20 | Foil conductor | 40 | End surface |
| 21 | Foil conductor region | 41 | Extension |
| 22 | Foil conductor region | 42 | Spring opening |
| 23 | Foil conductor region | | |

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An electric switch assembly comprising:

a switch lever having a free end with a longitudinal axis;

a support fixed on the free end of the switch lever, the support having an electrical conductor structure including fixed electrical contacts;

a rotary-push switch group placed on the free end of the switch lever, the rotary-push switch group including a rotary switch and a push switch each having movable electrical contacts, the movable electrical contacts being supported on corresponding ones of the fixed electrical contacts of the electrical conductor structure;

the rotary switch having a rotary actuating element being actuable to rotate about the longitudinal axis of the free end of the switch lever in response to rotary movement in order to actuate the movable electrical contacts of the rotary switch;

the push switch having an actuating element being actuable to move axially along the longitudinal axis of the free end of the switch lever in response to pushing movement directed axially along the free end of the switch lever in order to actuate the movable electrical contacts of the push switch;

wherein the fixed electrical contacts associated with the movable electrical contacts of the rotary switch lie in a plane transverse to the longitudinal axis of the free end of the switch lever; and a slider for holding the movable electrical contacts of the rotary switch, the slider being positively engaged to the rotary actuating element of the rotary switch to rotate about the longitudinal axis of the free end of the switch lever as the rotary actuating element rotates in order to guide the movable electrical contacts of the rotary switch concentrically about the longitudinal axis of the free end of the switch lever and along the corresponding fixed electrical contacts to generate a corresponding switching signal;

the slider being push-decoupled to the rotary actuating element of the rotary switch such that any pushing movement directed axially along the free end of the switch lever is absent from being felt by the slider.

2. The switch assembly of claim 1 wherein:

the slider is supported axially on the support.

3. The switch assembly of claim 1 wherein:

one of the rotary actuating element and the slider includes a fork seat and the other one of the rotary actuating element and the slider includes a driving pin, wherein the fork seat is open in the direction of the pushing movement of the rotary actuating element in which the driving pin engages for the push-decoupling between the slider and the rotary actuating element.

4. The switch assembly of claim 1 wherein:

the slider is formed by a support disc which holds the movable electrical contacts of the rotary switch.

5. The switch assembly of claim 1 wherein:

the support has an end surface facing the switch lever, the end surface of the support being a limit-stop surface for limiting axial mobility of the rotary switch and the push switch in the axial direction facing away from the switch lever.

6. The switch assembly of claim 1 wherein:

the fixed electrical contacts are part of a flexible foil conductor supported by the support.

7. The switch assembly of claim 1 wherein:

the support includes a contact frame which lies transverse to the longitudinal axis of the free end of the switch lever, the contact frame having an axially-facing end surface on which is placed the fixed electrical contacts corresponding to the movable electrical contacts of the rotary switch.

8. An electric switch assembly comprising:

a switch lever having a free end with a longitudinal axis;

a support fixed on the free end of the switch lever, the support having an electrical conductor structure including fixed electrical contacts;

a rotary-push switch group placed on the free end of the switch lever, the rotary-push switch group including a first and second rotary switches and a push switch, each of the switches having movable electrical contacts supported on corresponding ones of the fixed electrical contacts of the electrical conductor structure;

the first and second rotary switches having respective first and second rotary actuating elements being actuable to rotate about the longitudinal axis of the free end of the switch lever in response to rotary movement in order to actuate the movable electrical contacts of the first and second rotary switches;

the push switch having an actuating element being actuable to move axially along the longitudinal axis of the free end of the switch lever in response to pushing movement directed axially along the free end of the switch lever in order to actuate the movable electrical contacts of the push switch;

wherein the fixed electrical contacts associated with the movable electrical contacts of the first and second rotary switches lie in respective planes which are transverse to the longitudinal axis of the free end of the switch lever; and first and second sliders for holding the movable electrical contacts of the respective first and second rotary switches;

the first and second sliders each being positively engaged to the respective rotary actuating elements of the first and second rotary switches to rotate about the longitudinal axis of the free end of the switch lever as the rotary actuating elements rotate in order to guide the movable electrical contacts of the first and second rotary switches concentrically about the longitudinal axis of the free end of the switch lever and along the corresponding fixed electrical contacts to generate corresponding switching signals;

the first and second sliders being push-decoupled to the rotary actuating elements of the first and second rotary switches such that any pushing movement directed axially along the free end of the switch lever is absent from being felt by the first and second sliders.

9. The switch assembly of claim 8 wherein:

the slider is supported axially on the support.

10. The switch assembly of claim 8 wherein:

one of the rotary actuating element and the slider includes a fork seat and the other one of the rotary actuating element and the slider includes a driving pin, wherein the fork seat is open in the direction of the pushing movement of the rotary actuating element in which the driving pin engages for the push-decoupling between the slider and the rotary actuating element.

11. The switch assembly of claim 8 wherein:

the slider is formed by a support disc which holds the movable electrical contacts of the rotary switch.

12. The switch assembly of claim 8 wherein:

the support has an end surface facing the switch lever, the end surface of the support being a limit-stop surface for limiting axial mobility of the rotary switch and the push switch in the axial direction facing away from the switch lever.

13. The switch assembly of claim 8 wherein:

the fixed electrical contacts are part of a flexible foil conductor supported by the support.

14. The switch assembly of claim 8 wherein:

the first and second rotary switches being placed axially one behind the other along the longitudinal axis of the free end of the switch lever, the rotary actuating elements of the first and second rotary switches being separated by an intermediate ring, the intermediate ring being torque-decoupled relative to the rotary movements of the rotary actuating elements of the first and second rotary switches, the intermediate ring further having springs that act in the push direction.

15. The switch assembly of claim 14 wherein:

the springs of the intermediate ring are formed by at least two extensions that protrude axially from an end surface and are placed in front of a spring opening in the intermediate ring, the springs being supported on the rotary actuating element of the second rotary switch adjacent to the intermediate ring.

16. The switch assembly of claim 8 wherein:

the support includes a contact frame which lies transverse to the longitudinal axis of the free end of the switch lever, the contact frame having two axially-facing end surfaces on which are placed the fixed electrical contacts corresponding to the movable electrical contacts of the first and second rotary switches.

* * * * *